United States Patent
McLean et al.

(10) Patent No.: US 9,215,251 B2
(45) Date of Patent: Dec. 15, 2015

(54) APPARATUS, SYSTEMS, AND METHODS FOR MANAGING DATA SECURITY

(71) Applicant: AppSense Limited, Warrington (GB)

(72) Inventors: Ian J. McLean, Lymm (GB); Paul Delivett, Runcorn (GB)

(73) Assignee: AppSense Limited, Warrington (GB)

( * ) Notice: Subject to any disclaimer, the term of this patent is extended or adjusted under 35 U.S.C. 154(b) by 128 days.

(21) Appl. No.: 14/023,969

(22) Filed: Sep. 11, 2013

(65) Prior Publication Data

US 2015/0074744 A1   Mar. 12, 2015

(51) Int. Cl.
*H04L 29/06* (2006.01)
*H04W 12/00* (2009.01)

(52) U.S. Cl.
CPC .............. *H04L 63/20* (2013.01); *H04W 12/00* (2013.01)

(58) Field of Classification Search
CPC . H04L 63/20; G06F 2221/2113; H04W 12/00
USPC ........................................................... 726/1
See application file for complete search history.

(56) References Cited

U.S. PATENT DOCUMENTS

| | | | |
|---|---|---|---|
| 5,577,200 A * | 11/1996 | Abramson et al. | 714/50 |
| 6,321,334 B1 | 11/2001 | Jerger et al. | |
| 6,480,963 B1 * | 11/2002 | Tachibana et al. | 726/4 |
| 6,499,110 B1 * | 12/2002 | Moses et al. | 726/1 |
| 6,618,721 B1 * | 9/2003 | Lee | 726/26 |
| 6,763,344 B1 * | 7/2004 | Osentoski et al. | 1/1 |
| 7,529,932 B1 | 5/2009 | Haustein et al. | |
| 7,899,849 B2 * | 3/2011 | Chaudhry et al. | 707/821 |
| 8,135,385 B2 | 3/2012 | Ohta et al. | |
| 8,213,618 B2 | 7/2012 | Dewan | |
| 8,325,133 B1 * | 12/2012 | Machiraju | 345/156 |
| 8,359,389 B1 | 1/2013 | Cohen et al. | |
| 8,402,269 B2 | 3/2013 | Bae et al. | |
| 8,561,126 B2 * | 10/2013 | Ananthanarayanan et al. | 726/1 |
| 8,726,386 B1 | 5/2014 | McCorkendale et al. | |
| 2005/0183143 A1 * | 8/2005 | Anderholm et al. | 726/22 |
| 2008/0229382 A1 * | 9/2008 | Vitalos | 726/1 |

(Continued)

FOREIGN PATENT DOCUMENTS

| | | |
|---|---|---|
| JP | 2004287789 A | 10/2004 |
| WO | WO-0214989 A2 | 2/2002 |
| WO | WO-2013055501 A1 | 4/2013 |

OTHER PUBLICATIONS

United Kingdom Search Report issued by the Intellectual Property Office for the United Kingdom for Application No. GB1404501.4 mailed on Sep. 22, 2014 (3 pages).
United Kingdom Search Report issued by the Intellectual Property Office for the United Kingdom for Application No. GB1404513.2 mailed on Aug. 5, 2014 (3 pages).

(Continued)

*Primary Examiner* — Andrew Nalven
*Assistant Examiner* — Walter Malinowski
(74) *Attorney, Agent, or Firm* — Wilmer Cutler Pickering Hale and Dorr LLP (57) ABSTRACT

Disclosed embodiments of a data protection mechanism can provide secure data management. In particular, the disclosed embodiments provide secure data management mechanisms that can control transfer of data items so that contents of protected data items are not accessible to non-authorized parties. For example, the disclosed system can prevent an application from storing a protected file using a new file name. As another example, the disclosed system can prevent an application from sending a protected file to another computing device over a communication network.

18 Claims, 5 Drawing Sheets

(56) References Cited

U.S. PATENT DOCUMENTS

| | | | | |
|---|---|---|---|---|
| 2009/0089869 | A1* | 4/2009 | Varghese | 726/7 |
| 2009/0300045 | A1* | 12/2009 | Chaudhry et al. | 707/102 |
| 2010/0030781 | A1* | 2/2010 | Wong et al. | 707/9 |
| 2010/0095349 | A1* | 4/2010 | Motoyama | 726/1 |
| 2010/0228937 | A1 | 9/2010 | Bae et al. | |
| 2010/0299173 | A1* | 11/2010 | Zampiello et al. | 705/8 |
| 2010/0305977 | A1* | 12/2010 | Hogan et al. | 705/4 |
| 2011/0047594 | A1* | 2/2011 | Mahaffey et al. | 726/1 |
| 2011/0063699 | A1* | 3/2011 | Ishizuka et al. | 358/530 |
| 2011/0153854 | A1* | 6/2011 | Chickering | 709/229 |
| 2012/0066737 | A1* | 3/2012 | Zhang et al. | 726/1 |
| 2012/0072392 | A1* | 3/2012 | Crowhurst et al. | 707/608 |
| 2012/0131341 | A1* | 5/2012 | Mane et al. | 713/168 |
| 2012/0327033 | A1* | 12/2012 | Shimizu et al. | 345/175 |
| 2013/0318159 | A1* | 11/2013 | Earnshaw et al. | 709/204 |
| 2014/0115656 | A1* | 4/2014 | Kim et al. | 726/1 |
| 2014/0129524 | A1* | 5/2014 | Ueoka et al. | 707/681 |

OTHER PUBLICATIONS

Encrypting File System, http://en.wikipedia.org/wiki/Encrypting_File_System, retrieved on Jul. 24, 2013, 8 pages.
iOS App Programming Guide, http://developer.apple.com/library/ios/#DOCUMENTATION/iPhone/Conceptual/iPhoneOsProgrammingGuide/AdvancedAppTricks/AdvancedAppTricks.html#//apple_ref/doc/uid/TP40007072-CH7-SW11, Apr. 23, 2013, 149 pages.
Fingerprint (computing), http://en.wikipedia.org/wiki/Fingerprint_%28computing%29, retrieved on Jul. 24, 2013, 4 pages.
Citrix ShareFile, http://www.sharefile.com/, printed on Jul. 24, 2013, 2 pages.
OpenText Managed File Transfer, http://connectivity.opentext.com/resourcecentre/evaluations/opentext-managed-file-transfer.aspx, 2011, 1 page.
New Media Security for PC FAQs, http://www.newmediasecurity.com/products/nms_for_pc_faqs.html, printed on Mar. 10, 2014, 4 pages.

* cited by examiner

APPARATUS, SYSTEMS, AND METHODS FOR MANAGING DATA SECURITY

TECHNICAL FIELD

Disclosed apparatus, systems, and methods relate to managing data security in a computer system.

BACKGROUND

Cloud storage systems often use a client module at a computing device to upload and download data items, such as files, to and from a storage server. This client module can provide certain data security mechanisms, such as data encryption and data decryption, so that protected data items received from the storage server cannot be accessed by non-authorized parties. For example, the computing device can determine whether a data item received from a storage server should be protected from non-authorized parties, and if so, the computing device can encrypt the data item before storing it at local memory. Also, the client module can decrypt encrypted data to access contents of the encrypted data to provide to authorized parties.

Although the decryption of a protected data item can be performed under the control of the client module so that only authorized parties can access the protected data item, the client module cannot control transfer of the decrypted data item. For example, a user of the computing device can store a decrypted data item using a different file name or send the decrypted data item to another computing device, without providing any mechanism to protect the decrypted data item. Therefore, the client module cannot provide sufficient data security protection to decrypted data items.

Therefore, there is a need in the art to provide systems and methods for improving the data security management.

SUMMARY

In accordance with the disclosed subject matter, apparatus, systems, and methods are provided for managing data security in a computer system.

Disclosed embodiments include an apparatus. The apparatus can include non-transitory memory configured to store computer readable instructions of a module and a security status table, wherein the security status table comprises at least one identifier of protected data items that are subject to a security policy. The apparatus can also include a processor in communication with the memory, configured to run the module stored in the memory, wherein the module is configured to detect a transfer of a first data item to a destination device, wherein the transfer of the first data item is initiated by an application running on the apparatus, determine a first identifier of the first data item, determine that the security status table comprises the first identifier of the first data item, indicating that the first data item is a protected data item, and cause the security policy to be applied to the first data item to prevent non-authorized access to the first data item.

Disclosed embodiments include a method. The method can include maintaining, at a computing device, a security status table, wherein the security status table comprises at least one identifier of protected data items that are subject to a security policy; detecting, at the computing device, a transfer of a first data item to a destination device, wherein the transfer of the first data item is initiated by an application running on the computing device; and determining, at the computing device, a first identifier of the first data item. The method can further include determining, at the computing device, that the security status table comprises the first identifier of the first data item, indicating that the first data item is a protected data item; and causing, by the computing device, the security policy to be applied to the first data item to prevent non-authorized access to the first data item.

Disclosed embodiments include a non-transitory computer readable medium. The non-transitory computer readable medium can include executable instructions operable to cause a computing device to maintain a security status table that comprises at least one identifier of protected data items that are subject to a security policy; detect a transfer of a first data item to a destination device, wherein the transfer of the first data item is initiated by an application running on the computing device; determine a first identifier of the first data item; determine that the security status table comprises the first identifier of the first data item, indicating that the first data item is a protected data item; and cause the security policy to be applied to the first data item to prevent non-authorized access to the first data item.

In some embodiments, the apparatus, the method, or the non-tangible computer readable medium can include a module, steps, or executable instructions operable to cause the processor or the computing device to operate a hash function on at least a portion of the first data item to determine the identifier of the first data item.

In some embodiments, the hash function is a message digest function.

In some embodiments, the apparatus, the method, or the non-tangible computer readable medium can include a module, steps, or executable instructions operable to cause the processor or the computing device to receive a second data item from cloud storage over a communication network, wherein the second data item is a protected data item; determine a second identifier of the second data item; and store the second identifier of the second data item in the security status table.

In some embodiments, the apparatus, the method, or the non-tangible computer readable medium can include a module, steps, or executable instructions operable to cause the processor or the computing device to prevent the transfer of the first data item to apply the security policy.

In some embodiments, the destination device comprises a local storage medium of the apparatus, and wherein the transfer of the first data item is initiated as a part of a storage operation of the first data item.

In some embodiments, the destination device comprises a computing device in communication with the apparatus over a communication network.

In some embodiments, the apparatus, the method, or the non-tangible computer readable medium can include a module, steps, or executable instructions operable to cause the processor or the computing device to detect a transfer of a second data item to the destination device; determine that a size of the second data item is smaller than a predetermined size of data needed to determine an identifier of a data item; detect a transfer of a third data item to the destination device; merge the second data item and the third data item to form a fourth data item; determine a second identifier of the fourth data item; determine that the security status table comprises the second identifier, indicating that the second data item and the third data item are protected data items; and cause the security policy to be applied to the second data item and the third data item to prevent non-authorized access to the second data item and the third data item.

In some embodiments, the apparatus, the method, or the non-tangible computer readable medium can include a module, steps, or executable instructions operable to cause the processor or the computing device to retrieve the first data item from the destination device of the transfer; and cause the destination device to restore to a state prior to receiving the first data item.

In some embodiments, the apparatus, the method, or the non-tangible computer readable medium can include a module, steps, or executable instructions operable to cause the processor or the computing device to restore data over which the first data item was stored.

These and other capabilities of embodiments will be more fully understood after a review of the following figures, detailed description, and claims.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the apparatus, systems, and methods, and the environment in which such apparatus, systems, and methods may operate, in order to provide a thorough understanding. It will be apparent to one skilled in the art, however, that the disclosed subject matter may be practiced without such specific details, and that certain features, which are well known in the art, are not described in detail in order to avoid complication. In addition, it will be understood that the embodiments described below are only examples, and that it is contemplated that there are other systems and methods that are within the scope.

Throughout the disclosure, the term "data item" is generally used to refer to a sequence of bits carrying information. The data item can include a file, a document, a record, contents of a file, a page in memory, a digital message, or any other entity that can be represented by a sequence of bits. Other embodiments of a "data item" are within the scope of the disclosed subject matter. A data item can include metadata and contents. The metadata can provide a description of the contents in the data item.

The disclosed embodiments of a data protection mechanism can provide secure data management. In particular, the disclosed embodiments provide secure data management mechanisms that can control transfer of data items so that contents of protected data items are not accessible to non-authorized parties. For example, the disclosed system can prevent an application from storing a protected file using a new file name. As another example, the disclosed system can prevent an application from sending a protected file to another computing device over a communication network. The disclosed embodiments can be effective regardless of a name of a data item, a type of a data item movement (e.g., a data storage operation or a data transmission operation), a storage location of a data item, or a type of a data storage medium.

The disclosed embodiments of the data security mechanism can include a security module running on a computing device. The security module can communicate with a security status table. The security status table can include identifiers of protected data items that should be protected from non-authorized parties and should be subject to a security policy. When the security module detects a transfer of a data item whose identifier is included in the security status table, the security module can apply the security policy associated with a protected data item. In some cases, the security policy can prevent a transfer of a protected data item within a computing device or across a communication network in a cloud storage system.

The disclosed embodiments of a data security mechanism can be useful for controlling transfer of protected data items received from cloud storage. For example, a client module running on a computing device can download a file from a storage server in a cloud storage system, encrypt the downloaded file, and store the encrypted file in a local storage medium of the computing device. The client module can also compute an identifier of the downloaded file and store the identifier in a security status table.

When a user of the computing device requests access to the stored file using an application running on the computing device, the client module can retrieve and decrypt the stored, encrypted file, and provide the decrypted file to the application. If the user attempts to perform an unauthorized operation on the decrypted file, such as a transfer of the decrypted file to an unauthorized destination device, a security module in the computing device can detect the attempt and apply the security policy. For instance, if the user requests the computing device to save contents of the decrypted file with a new file name, to save contents of the decrypted file outside of a storage area managed by the client module, or to transmit the decrypted file to another computing device or a server over a communication network, then the security module can prevent the request from being executed.

The security module can detect an unauthorized operation via a fingerprint mechanism. For example, upon receiving a request for a transfer of a data item, such as a file, the security module can intercept or copy the contents of the data item and compute an identifier of the data item. If the computed identifier of the data item matches one of the identifiers in the security status table, then the security module can determine that the data item is one of the protected data items and prevent the application from transferring the data item.

An identifier of a data item can include a unique identifier that uniquely identifies a data item. The unique identifier can sometimes be referred to as a fingerprint of the data item. In some cases, the unique identifier can include a hash value of the data item's contents. The hash value can be computed based on hashing mechanisms, which may include operating a hash function on a portion of the data item's contents. The hash function can include a message digest function that can be used to produce digital summaries of information called message digests. A message digest function includes a mathematical function that can process bits of information to produce a different message digest for each unique document. The message digest function can include an MD5 function.

In some cases, the unique identifier can be computed based on a portion of the data item's contents, rather than the entirety of the data item's contents. This way, the security module can detect transfer of modified data items, as long as the modification does not modify the portion of the data item from which the unique identifier is computed.

Figure 1:
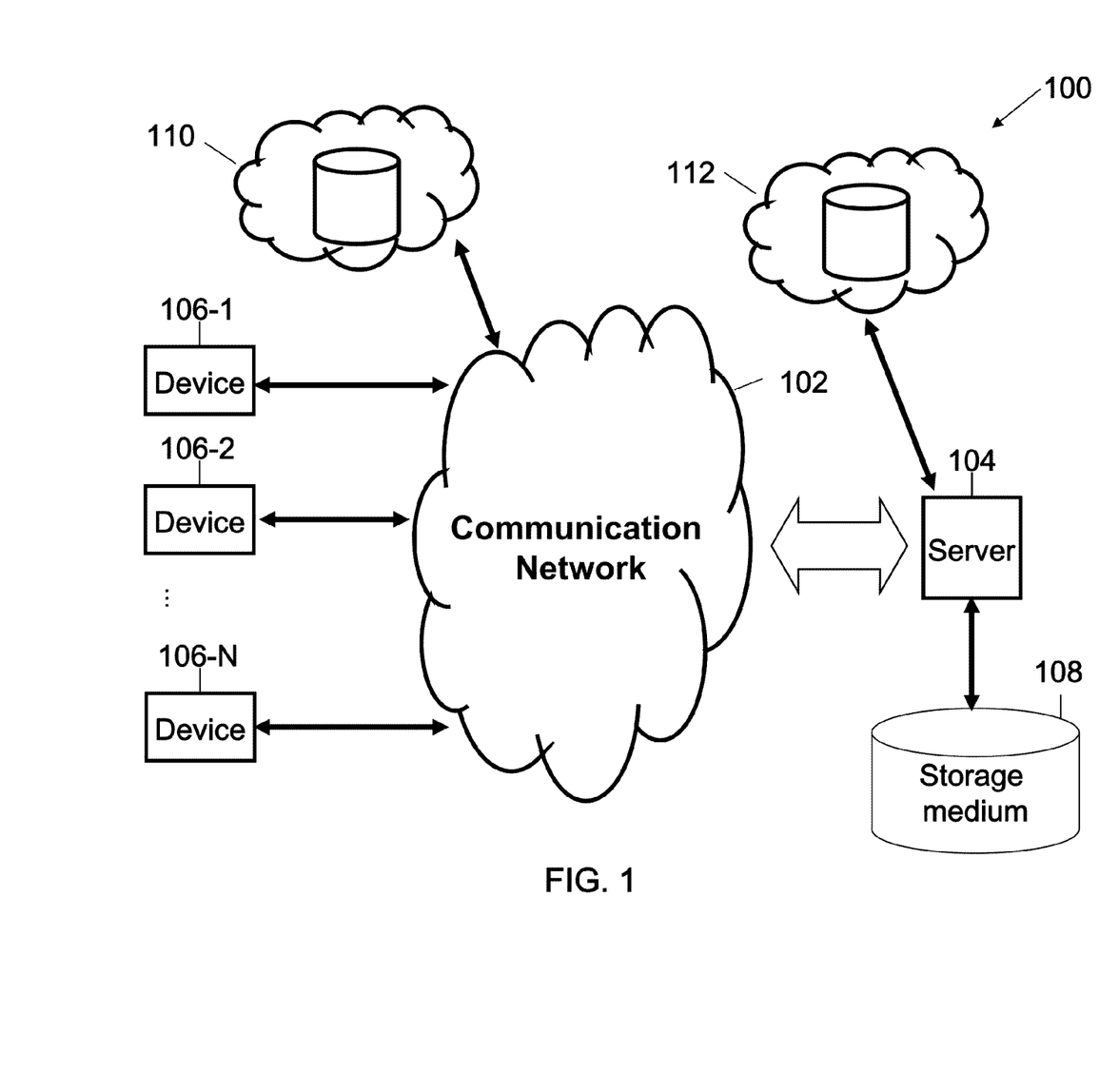
FIG. 1 illustrates an exemplary networked computing environment in accordance with some embodiments.

The disclosed embodiments can be implemented in a networked computing environment. FIG. 1 illustrates an exemplary networked computing environment 100 in accordance with some embodiments. The networked computing environment 100 can include a server 104, at least one computing device 106 (e.g., computing device 106-1, 106-2, 106-N), a physical storage medium 108, and cloud storage 110 and 112, which can all be coupled directly or indirectly to a communication network 102.

Each computing device 106 can communicate with the server 104 to send data to, and receive data from, the server 104 across the communication network 102. Each computing device 106 can be directly coupled to the server 104. Additionally, each computing device 106 can be connected to server 104 via any other suitable device, communication network, or combination thereof. For example, each computing device 106 can be coupled to the server 104 via one or more routers, switches, access points, and/or communication network (as described below in connection with communication network 102). A computing device 106 can include, for example, a desktop computer, a mobile computer, a tablet computer, a cellular device, a smartphone, or any computing systems that are capable of performing computation.

The computing device 106 can include a security module that is configured to provide a security policy to police transfer of protected data items. The security module can communicate with a security status table that includes identifiers of the protected data items. The security module can use the security status table to determine whether the security policy should be applied to a data item. For example, the security module can compute an identifier of a data item and search the security status table to determine whether the security table includes the computed identifier. If the security table includes the computed identifier, the security module can apply the security policy to police transfer of the data item; if the security table does not include the computed identifier, the security module can allow transfer of the data item. In some embodiments, the security module can be a part of a client module running in a computing device of a cloud storage system.

Server 104 can be coupled to at least one physical storage medium 108, which can be configured to store data for the server 104. Preferably, any computing device 106 can store data in, and access data from, the physical storage medium 108 via the server 104. FIG. 1 shows the server 104 and the physical storage medium 108 as separate components; however, the server 104 and physical storage medium 108 can be combined together. FIG. 1 also shows the server 104 as a single server; however, server 104 can include more than one server. FIG. 1 shows the physical storage medium 108 as a single physical storage medium; however, physical storage medium 108 can include more than one physical storage medium. The physical storage medium 108 can be located in the same physical location as the server 104, at a remote location, or any other suitable location or combination of locations.

FIG. 1 shows two embodiments of cloud storage 110 and 112. Cloud storage 110 and/or 112 can store data from physical storage medium 108 with the same restrictions, security measures, authentication measures, policies, and other features associated with the physical storage medium 108. While FIG. 1 shows the cloud storage 112 separate from the communication network 102, cloud storage 112 can also be part of communication network 102 or another communication network. The server 104 can use only cloud storage 110, only cloud storage 112, or both cloud storages 110 and 112. While FIG. 1 shows one cloud storage 110 and one cloud storage 112, more than one cloud storage 110 and/or more than one cloud storage 112 or any suitable combination thereof can be used.

The communication network 102 can include the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks may be implemented with any number of hardware and software components, transmission media and network protocols. While FIG. 1 shows the network 102 as a single network, the network 102 can also include multiple interconnected networks listed above.

The computing device 106 can use a client module and a security module to control unauthorized operation on a protected data item, such as a transfer of a protected data item. The client module can be configured to receive a protected data item, compute an identifier of the protected data item, and store the identifier in a security status table so that the security status table maintains identifiers of protected data items. On the other hand, the security module can be configured to detect an operation on a data item, such as a transfer of a data item, compute an identifier of the detected data item, and determine whether the security status table includes the identifier of the detected data item. If so, the security module can prevent the transfer of the detected data item; if not, the security module can allow the transfer of the detected data item.

Figure 2:
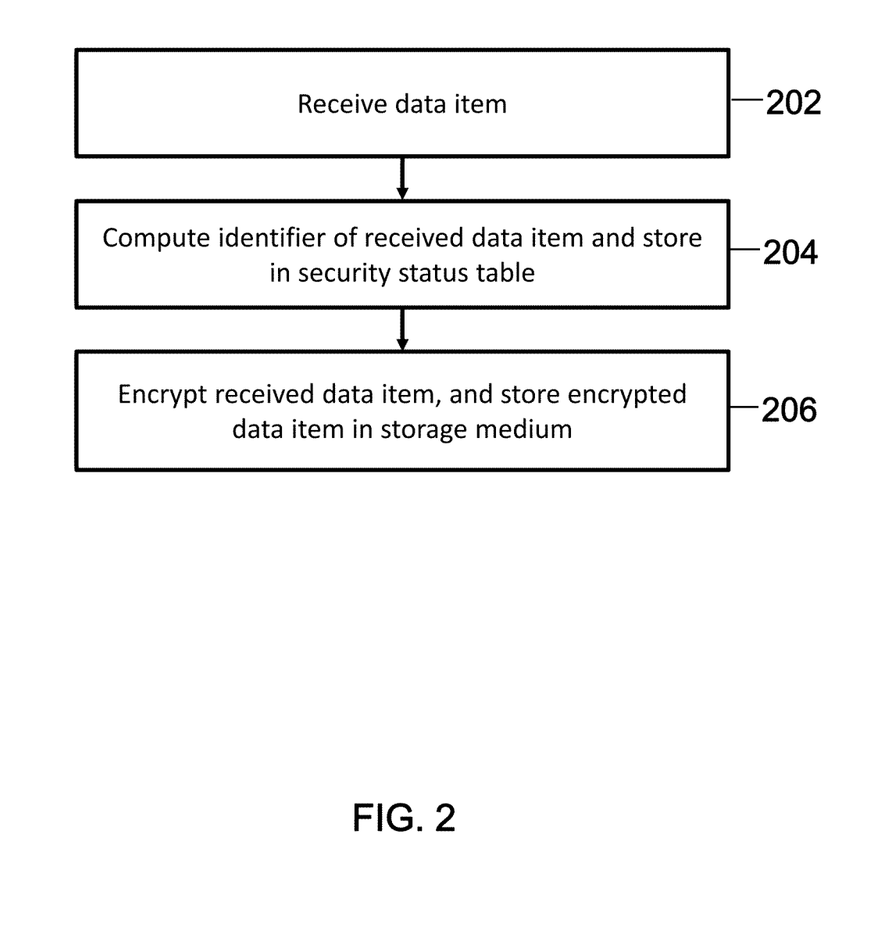
FIG. 2 illustrates an operation of a client module in a computing device in accordance with some embodiments.

FIG. 2 illustrates an operation of a client module in a computing device in accordance with some embodiments. The client module is configured to perform an encryption and an identifier computation of a data item. In step 202, the client module is configured to receive a protected data item. The protected data item includes a data item that is protected from non-authorized parties and should be subject to a security policy. The protected data item can include a data item that originated from a secure storage medium. For example, the protected data item can include a data item stored in a password protected storage medium.

In some embodiments, the client module can receive the protected data item from a server 104. In other embodiments, the client module can receive the protected data item from cloud storage 110 and 112. In other embodiments, the client module can receive the data item from a storage medium coupled to the computing device 106. The storage medium coupled to the computing device 106 can include a portable storage medium, such as a universal serial bus (USB) drive. In other embodiments, the client module can receive the data item that is a modification of an existing data item stored in a local storage medium.

In step 204, the client module can compute an identifier of the received data item and store the identifier of the received protected data item in a security status table. The security status table can, therefore, maintain a set of identifiers associated with protected data items.

The identifier of a protected data item can be a unique identifier that uniquely (or substantially uniquely) identifies the received protected data item (i.e., there is a one-to-one correspondence between an identifier and a protected data item.) The identifier can be computed in any suitable way or combination of ways. In some cases, the unique identifier of a data item can be computed using a hashing mechanism. The hashing mechanism can include operating a hash function on a portion of the data item's contents. The hash function can include a message digest function, such as an MD5 function.

In such cases, the unique identifier of a data item can be a hash value of the data item's contents.

In some embodiments, the unique identifier can be computed based on the entirety of the data item, including contents of the data item and metadata of the data item. The metadata of the data item can include a header of the data item. In other embodiments, the unique identifier can be computed based on contents of the data item. In other embodiments, the unique identifier can be computed based on a predetermined portion of the data item. In particular, the unique identifier can be computed based on a predetermined number of bits in one or more predetermined locations of the data item. For example, the unique identifier can be computed based on bit locations 0 through 1023 of contents of the data item. As another example, the unique identifier can be computed based on bit locations 0 through 511 of and bit locations 1024 through 1535 of contents of the data item.

In some embodiments, the client module can also optionally store, in the security status table, a security policy to be applied to the received protected data item. The security policy can include rules that govern the transfer of protected data items. For example, the security policy can include a rule that, if an attempted transfer of a protected data item is detected, the security module should prevent the transfer of the data item. By associating a protected item to a security policy, different security policies can be applied to different protected items listed in the security status table.

Figure 3:
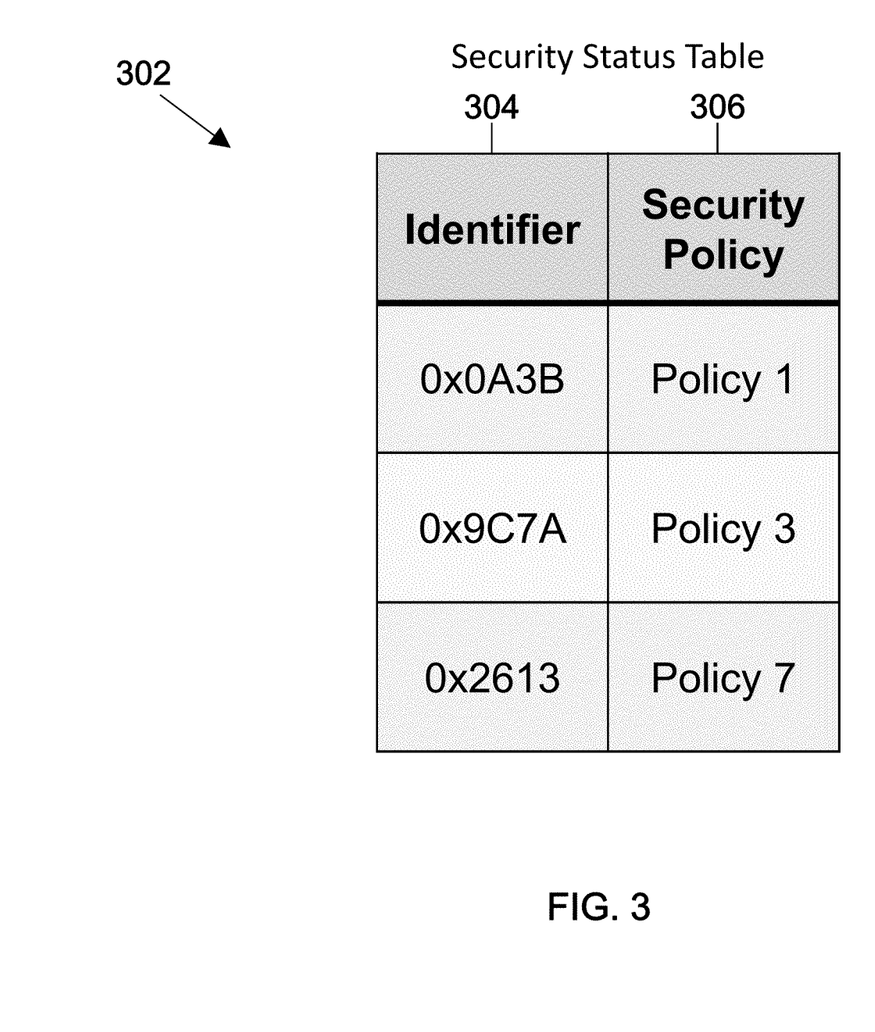
FIG. 3 illustrates a security status table in accordance with some embodiments.

FIG. 3 illustrates a security status table in accordance with some embodiments. The security status table 302 can include a first column 304 that lists identifiers associated with protected data items. The security status table 302 can optionally include a second column 306 that identifies a security policy to be applied to a corresponding data item in the first column.

In step 206, the client module can encrypt the received data item and store the encrypted data item in a storage medium, such as a local storage medium of the computing device 106. In some embodiments, the client module can perform step 206 prior to step 204.

In some cases, an application running on the computing device can request the client module to provide the encrypted data item stored in the storage medium. The client module can determine whether the application is authorized to access the encrypted data item, and if so, the client module can decrypt the encrypted data item, and provide the decrypted data item to the application.

Subsequently, the application can attempt to perform an operation on the decrypted data item. For example, the application can attempt to store contents of the decrypted data item using a different name, the application can attempt to copy the contents of the decrypted data item into another data file, or the application can attempt to transmit contents of the decrypted data item to another computing device or a server over a communication network. In this case, the security module can detect the operation and determine if the application attempts to perform the operation on a protected data item, such as the decrypted data item received from the client module. If so, the security module can prevent the execution of the operation attempted by the application.

Figure 4:
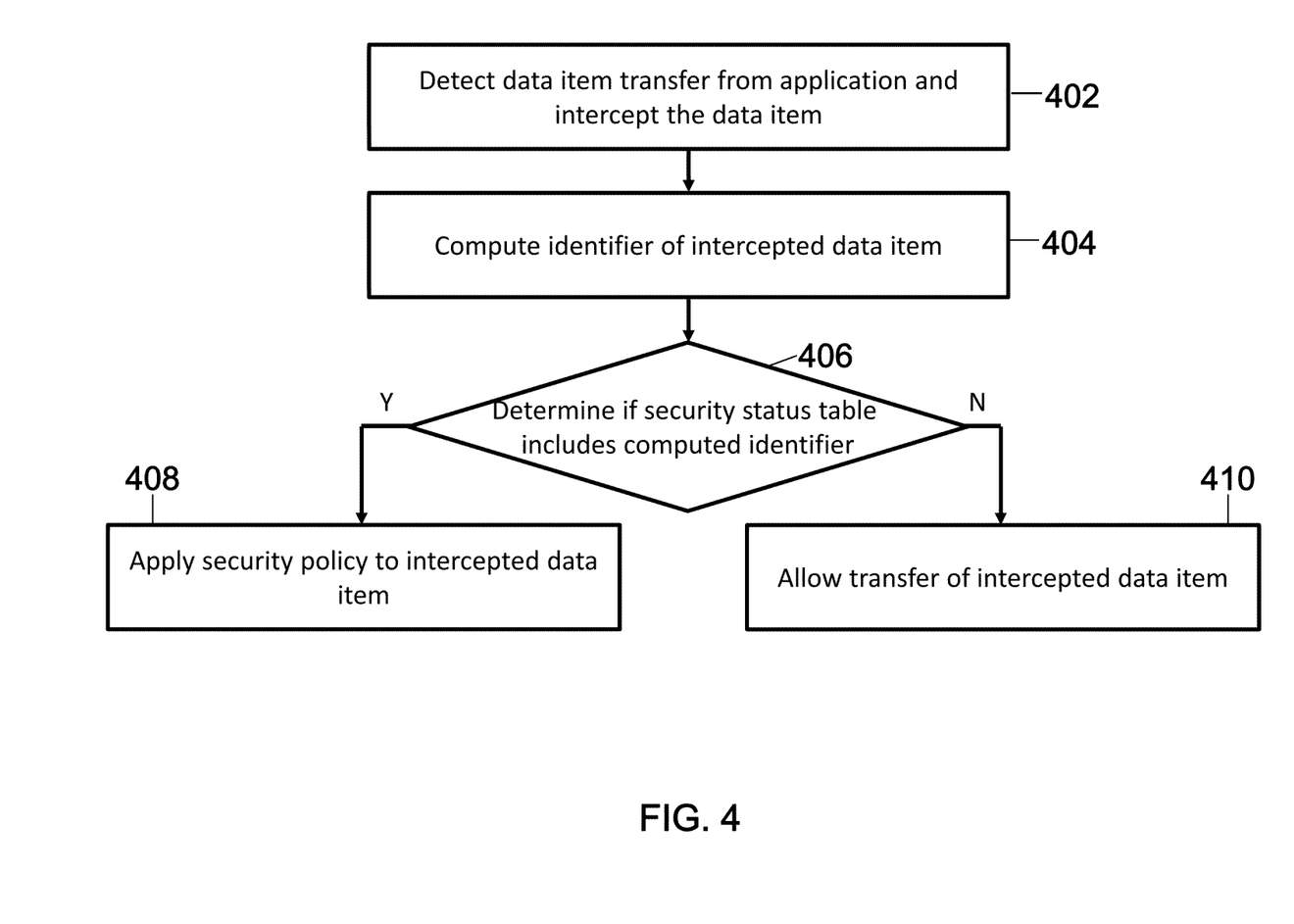
FIG. 4 illustrates an operation of a security module in a computing device in accordance with some embodiments.

FIG. 4 illustrates an operation of a security module in a computing device in accordance with some embodiments. In step 402, the security module can detect an attempt to transfer (or an actual transfer of) a data item to a destination device, such as a local storage device or another computing device, by an application running on the computing device 106. For example, the security module can detect an attempt to store (or an actual store of) a decrypted data item in a local storage medium, or an attempt to transmit (or an actual transmission of) a decrypted data item to another computing device or a server 104. In some embodiments, the security module can detect a transfer of a data item by monitoring one or more applications that currently have access to at least one decrypted data item. In other embodiments, the security module can detect a transfer of a data item by monitoring a data flow between an application and an operating system (OS) in the computing device. This way, the security module can observe one or more operations attempted by the application running on the computing device and can block or allow the one or more operations attempted by the application. In some cases, such a security module can be implemented using a filter driver; in other cases, such a security module can be implemented using a dynamic link library (DLL) 'hook' on the Windows operating system.

Once the security module detects an attempted transfer or an actual transfer of a data item, the security module can intercept (e.g., copy) at least a portion of the data item. In some embodiments, the intercepted data item can be encrypted. If the intercepted data item is encrypted, the security module can be configured to decrypt the intercepted data item and use the decrypted data item for steps 404 and 406.

In step 404, the security module can compute an identifier of the intercepted portion of the data item. In some embodiments, the security module can use the same identifier computation mechanism as the client module, as illustrated with respect to step 204 of FIG. 2. For example, if the client module is configured to use one or more portions of a data item to compute an identifier of a data item, the security module can be configured to use the same portions of a data item to compute the identifier of a data item.

In step 406, the security module can determine whether the security status table 302 includes the identifier of the intercepted portion of the data item. If the security status table 302 includes the identifier of the intercepted portion of the data item, the security module can determine that the data item is a protected data item to which a security policy should be applied. In this case, the security module can proceed to step 408. If the security status table 302 does not include the identifier of the intercepted data item, the security module can determine that the intercepted data item is not a protected data item. In this case, the security module can proceed to step 410. If only portions of the data item are used to compute the identifier of a data item in step 404, the security module can detect transfer of a modified data item, as long as the modification does not modify the portion of a data item from which the unique identifier is computed.

In step 408, the security module can be configured to apply a security policy to the data item since the security module determined, in step 406, that the data item is a protected data item. If the security status table 302 includes a security policy to be applied to the detected data item, the security module can retrieve, from the security status table 302, the security policy to be applied to the detected data item.

In some embodiments, the security policy can include rules that govern the transfer of protected data items. For example, the security policy can include a rule that, if an attempted transfer of a protected data item is detected, the security module should prevent the transfer of the protected data item.

In some embodiments, the security module can be configured to prevent the transfer of a protected data item by dropping the protected data item from the data flow so that the protected data item does not reach the destination device. In other embodiments, as discussed above, the security module can be configure to prevent the transfer of a protected data item by issuing an error message to the application that attempted the transfer of the protected data item. For example, the security module can prevent the transfer of a protected data item by issuing a transfer error message, such as "access denied," to the application that attempted the transfer of the protected data item. The transfer error message can prevent the transfer of the protected data item and also trigger an error handling operation in the application.

In some embodiments, the security module can receive the security policy from a server 104. In other embodiments, the security module can receive the security policy from the cloud storage 110 and 112. In some cases, the security policy can be defined in a JavaScript Object Notation (JSON) file.

In step 410, the security module can be configured to allow the transfer of the intercepted data item since the security module determined, in step 406, that the intercepted data item is not a protected data item.

In some cases, the security module may need at least a predetermined amount of data (or a predetermined number of bits of data) to compute an identifier of a data item in step 404, and the predetermined amount of data may be greater than the size of the data item being transferred (or being intercepted by the security module) in step 402. For example, an application running on the computing device 106 can divide a data item into a plurality of sub-data items and transfer each of the plurality of sub-data items independently over time. In this case, each sub-data item can be smaller than the predetermined amount of data needed to compute the identifier in step 404.

To address this issue, in some embodiments of step 402, if the size of an intercepted data item is smaller than the predetermined amount of data (i.e., the predetermined number of bits) needed to compute the identifier, the security module can intercept additional data items over time to accumulate sufficient data to compute the identifier.

For example, if the size of an intercepted data item is smaller than the predetermined amount of data, then the security module can wait for transmission of additional data items that are related to the already intercepted data item. Once the security module detects the transfer of the additional related data items, the security module can intercept the additional related data items until the number of bits associated with all intercepted data items is greater than the predetermined amount of data needed to compute the identifier. In some cases, the security module can use a queue to maintain all intercepted data items in a temporal order. Then the security module can merge the intercepted data items to form a single, merged data item. Subsequently, in step 404, the security module can compute an identifier of the single, merged data item to determine if the intercepted data items correspond to a protected data item.

In some cases, the merging of multiple data items to form a single, merged data item can include a concatenation of the intercepted data items. In other cases, the merging of multiple data items to form a single, merged data item can include a concatenation of only contents of the intercepted data items (e.g., without the headers.)

In some embodiments, in step 402, the security module can identify data items that are related to an already intercepted data item based on a common context amongst data items. The common context can include a handle associated with an access of a file. For example, when an application accesses a file, the application can associate the file access with a handle, which can be used for every operation on that file until the access to the file is terminated. Therefore, the security module can monitor the handle associated with data items to determine that the data items are related (i.e., the data items are parts of a single file).

In some embodiments, the security module can be configured to compute an identifier of a data item only after the data item has been fully transferred to a destination device. In some cases, an application can divide an original data item, such as a file, into a plurality of sub-data items, such as smaller files, and transfer the plurality of sub-data items independently to a destination device. If the security status table 302 has an identifier of the original data item but does not have identifiers of the sub-data items of the original data, then the security module that computes an identifier of a single sub-data item cannot identify the sub-data item as a protected data item, which leads to an erroneous outcome.

To address this issue, when an application divides a data item into a plurality of sub-data items and transfers the plurality of sub-data items independently to a destination device, the security module can be configured to compute an identifier of the data item only after each of the plurality of sub-data items have been transferred to the destination device. For example, in an alternative embodiment of step 402, the security module can detect a transfer of a sub-data item to a destination device, such as a storage device or a server over a communication network. Instead of intercepting the sub-data item, the security module can wait until all sub-data items of the corresponding data item are fully transferred to the destination device. As discussed above, the security module can determine that sub-data items correspond to a single data item based on a common context associated with the sub-data items.

Once the transfer is completed, the security module is configured to access the transferred data item (or the transferred sub-data items) so that the security module can compute the identifier of the transferred data item as a whole. The security module can be configured to access the transferred sub-data items by one of at least two mechanisms. In the first mechanism, the security module can be configured to monitor transfer of sub-data items and make a copy of transferred sub-data items, during the transfer, in a local storage medium. This way, once the transfer is completed, the security module would have access to all transferred sub-data items. In the second mechanism, the security module can be configured to retrieve the transferred data item from the destination device.

Once the security module receives the transferred data item, the security module can proceed to steps 404 and 406 of FIG. 4. If the security module determines that the security status table 302 includes the computed identifier of the transferred data item, then in step 408, the security module can trigger a "roll-back" of the data item transfer. For example, the security module can be configured to trigger the destination device, such as a remote storage medium, to remove or expunge the transferred data item and to restore the destination device to a state prior to receiving the transferred data item. The restoration of the destination device to a state prior to receiving the transferred data item can include restoring data over which the transferred data item was stored.

Figure 5:
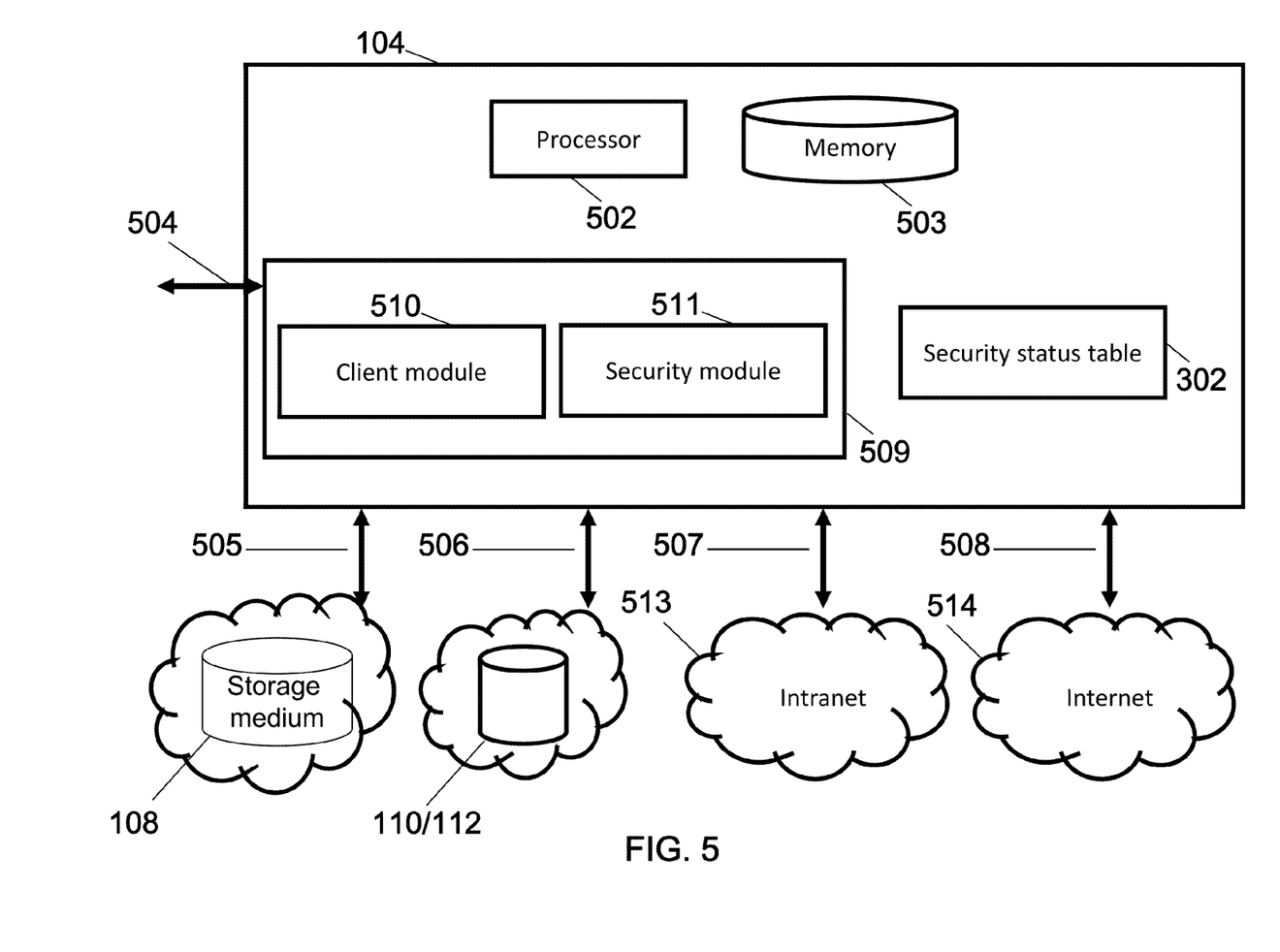
FIG. 5 is a block diagram of an exemplary computing device in accordance with some embodiments.

FIG. 5 is a block diagram of an exemplary computing device in accordance with some embodiments. The computing device 106 includes a processor 502, a memory 503, interfaces 504-508, a module 509 including a client module 510 and a security module 511, and a security status table 302. The computing device 106 can communicate with other computing devices (not shown) via the interface 504; the computing device 106 can communicate with the local network storage 108 via the interface 505; the computing device 106 can communicate with the remote network storage 110 via the interface 506; the computing device 106 can communicate with the Intranet 513 via the interface 507; and the computing device 106 can communicate with the Internet 514 via the interface 508. The interfaces 504-508 are shown as separate interfaces but may be the same physical interface. The computing device 106 may include additional modules, fewer modules, or any other suitable combination of modules that perform any suitable operation or combination of operations.

The interfaces 504-508 provide an input and/or output mechanism for communication. In some cases, the interfaces 504-508 can be used to communicate within the computing system. For example, the processor 502 can use one of the interfaces 504-508 to communicate with memory 503. In other cases, the interface 504-508 can be used to communicate over a network. The interfaces 504-508 enable communication with other computing systems, such as computing devices 106 and servers 104, as well as other network nodes in the communication network 102. The interfaces 504-508 can be implemented in hardware to send and receive signals in a variety of mediums, such as optical, copper, and wireless, and in a number of different protocols, some of which may be non-transient.

In some embodiments, the processor 502 can include one or more cores and can accommodate one or more threads to run various applications and modules, including the module 509 that includes the client module 510 and the security module 511.

The client module 510 can be configured to receive a protected data item, compute an identifier of the protected data item, and store the identifier in a security status table 302 so that the security status table 302 maintains identifiers of protected data items. The security module 511 can be configured to detect a transfer of a data item, compute the identifier of the detected data item, and determine whether the security status table 302 includes the identifier of the detected data item. If so, the security module 511 can apply a security policy and prevent the transfer of the detected data item; if not, the security module 511 can allow the transfer of the detected data item.

In some embodiments, the module 509 can be implemented in software stored in the memory 503. The memory 503 can be a non-transitory computer readable medium, flash memory, a magnetic disk drive, an optical drive, a programmable read-only memory (PROM), a read-only memory (ROM), or any other memory or combination of memories. The software can run on a processor 502 capable of executing computer instructions or computer code. The processor 502 might also be implemented in hardware using an application specific integrated circuit (ASIC), programmable logic array (PLA), field programmable gate array (FPGA), or any other integrated circuit.

The computing device 106 can operate using an operating system (OS) software. In some embodiments, the OS software is based on a Linux software kernel and runs specific applications in the computing device 106 such as monitoring tasks and providing protocol stacks. The OS software allows resources to be allocated separately for control and data paths. For example, certain packet accelerator cards and packet services cards are dedicated to performing routing or security control functions, while other packet accelerator cards/packet services cards are dedicated to processing user session traffic. As network requirements change, hardware resources can be dynamically deployed to meet the requirements in some embodiments.

The computing device 106 can include user equipment. The user equipment communicates with one or more radio access networks and with wired communication networks. The user equipment can be a cellular phone having phonetic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

The computing device 106 can also include any platforms capable of computations and communication. Non-limiting examples can include televisions (TVs), video projectors, set-top boxes or set-top units, digital video recorders (DVR), computers, netbooks, laptops, and any other audio/visual equipment with computation capabilities. The computing device 106 is configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. The computing device 106 can also provide a variety of user interfaces such as a keyboard, a touch screen, a trackball, a touch pad, and/or a mouse. The computing device 106 may also include speakers and a display device in some embodiments.

Although the disclosed subject matter has been described and illustrated in the foregoing exemplary embodiments, it is understood that the present disclosure has been made only by way of example, and that numerous changes in the details of implementation may be made without departing from the spirit and scope, which is limited only by the claims which follow.

A "server," "client," "agent," "module," "interface," and "host" is not software per se and includes at least some tangible, non-transitory hardware that is configured to execute computer readable instructions. In addition, the phrase "based on" does not imply exclusiveness—for example, if X is based on A, X can also be based on B, C, and/or D.

What is claimed is:

1. An apparatus comprising:
non-transitory memory configured to store computer readable instructions of a module and a security status table, wherein the security status table comprises at least one identifier of protected data items that are subject to a security policy;
a processor in communication with the memory, configured to run the module stored in the memory, wherein the module is configured to:
detect a transfer of a first data item to a destination device, wherein the transfer of the first data item is initiated by an application running on the apparatus;
determine a first identifier of the first data item;
determine that the security status table comprises the first identifier of the first data item, indicating that the first data item is a protected data item;
cause the security policy to be applied to the first data item to prevent non-authorized access to the first data item;
detect a transfer of a second data item to the destination device;
determine that a size of the second data item is smaller than a predetermined size of data needed to determine an identifier of a data item;

detect a transfer of a third data item to the destination device;
merge the second data item and the third data item to form a fourth data item;
determine a second identifier of the fourth data item;
determine that the security status table comprises the second identifier, indicating that the second data item and the third data item are protected data items; and
cause the security policy to be applied to the second data item and the third data item to prevent non-authorized access to the second data item and the third data item.

2. The apparatus of claim 1, wherein the module is configured to operate a hash function on at least a portion of the first data item to determine the identifier of the first data item.

3. The apparatus of claim 2, wherein the hash function is a message digest function.

4. The apparatus of claim 1, wherein the module is configured to:
receive a second data item from cloud storage over a communication network, wherein the second data item is a protected data item;
determine a second identifier of the second data item; and
store the second identifier of the second data item in the security status table.

5. The apparatus of claim 1, wherein the module is configured to prevent the transfer of the first data item in accordance with the security policy.

6. The apparatus of claim 1, wherein the destination device comprises a local storage medium of the apparatus, and wherein the transfer of the first data item is initiated as a part of a storage operation of the first data item.

7. The apparatus of claim 1, wherein the destination device comprises a computing device in communication with the apparatus over a communication network.

8. The apparatus of claim 1, wherein the module is configured to:
retrieve the first data item from the destination device of the transfer; and
cause the destination device to restore to a state prior to receiving the first data item.

9. The apparatus of claim 8, wherein the module is configured to cause the destination device to restore data over which the first data item was stored.

10. A method comprising:
maintaining, at a computing device, a security status table, wherein the security status table comprises at least one identifier of protected data items that are subject to a security policy;
detecting, at the computing device, a transfer of a first data item to a destination device, wherein the transfer of the first data item is initiated by an application running on the computing device;
determining, at the computing device, a first identifier of the first data item;
determining, at the computing device, that the security status table comprises the first identifier of the first data item, indicating that the first data item is a protected data item;
causing, by the computing device, the security policy to be applied to the first data item to prevent non-authorized access to the first data item;
detecting, at the computing device, a transfer of a second data item to the destination device;
determining, at the computing device, that a size of the second data item is smaller than a predetermined size of data needed to determine an identifier of a data item;
detecting, at the computing device, a transfer of a third data item to the destination device;
merging, at the computing device, the second data item and the third data item to form a fourth data item;
determining, at the computing device, a second identifier of the fourth data item;
determining, at the computing device, that the security status table comprises the second identifier, indicating that the second data item and the third data item are protected data items; and
causing, by the computing device, the security policy to be applied to the second data item and the third data item to prevent non-authorized access to the second data item and the third data item.

11. The method of claim 10, wherein determining the first identifier of the first data item comprises operating a hash function on at least a portion of the first data item.

12. The method of claim 11, wherein the hash function is a message digest function.

13. The method of claim 10, further comprising:
receiving, at the computing device, a second data item from cloud storage over a communication network, wherein the second data item is a protected data item;
determining, at the computing device, a second identifier of the second data item; and
storing, by the computing device, the second identifier of the second data item in the security status table.

14. The method of claim 10, wherein applying the security policy comprises preventing the transfer of the first data item to the destination device.

15. A non-transitory computer readable medium having executable instructions operable to cause a computing device to:
maintain a security status table that comprises at least one identifier of protected data items that are subject to a security policy;
detect a transfer of a first data item to a destination device, wherein the transfer of the first data item is initiated by an application running on the computing device;
determine a first identifier of the first data item;
determine that the security status table comprises the first identifier of the first data item, indicating that the first data item is a protected data item;
cause the security policy to be applied to the first data item to prevent non-authorized access to the first data item;
detect a transfer of a second data item to the destination device;
determine that a size of the second data item is smaller than a predetermined size of data needed to determine an identifier of a data item;
detect a transfer of a third data item to the destination device;
merge the second data item and the third data item to form a fourth data item;
determine a second identifier of the fourth data item;
determine that the security status table comprises the second identifier, indicating that the second data item and the third data item are protected data items; and
cause the security policy to be applied to the second data item and the third data item to prevent non-authorized access to the second data item and the third data item.

16. The non-transitory computer readable medium of claim 15, further comprising executable instructions operable to cause the computing device to operate a hash function on at least a portion of the first data item to determine the first identifier of the first data item.

17. The non-transitory computer readable medium of claim 15, further comprising executable instructions operable to cause the computing device to:
- receive a second data item from cloud storage over a communication network, wherein the second data item is a protected data item;
- determine a second identifier of the second data item; and
- store the second identifier of the second data item in the security status table.

18. The non-transitory computer readable medium of claim 15, further comprising executable instructions operable to cause the computing device to:
- retrieve the first data item from the destination device of the transfer; and
- cause the destination device to restore to a state prior to receiving the first data item.

* * * * *